US009656453B2

(12) United States Patent
Georgeson et al.

(10) Patent No.: US 9,656,453 B2
(45) Date of Patent: May 23, 2017

(54) MONITORING COMPOSITE MANUFACTURING AND REPAIR PROCESSES USING CHROMATIC FILMS

(71) Applicant: The Boeing Company, Chicago, IL (US)

(72) Inventors: Gary Ernest Georgeson, Tacoma, WA (US); Richard H. Bossi, Renton, WA (US)

(73) Assignee: THE BOEING COMPANY, Chicago, IL (US)

(*) Notice: Subject to any disclaimer, the term of this patent is extended or adjusted under 35 U.S.C. 154(b) by 0 days.

(21) Appl. No.: 15/173,718

(22) Filed: Jun. 6, 2016

(65) Prior Publication Data

US 2016/0279923 A1 Sep. 29, 2016

Related U.S. Application Data

(62) Division of application No. 13/791,207, filed on Mar. 8, 2013, now Pat. No. 9,446,575.

(51) Int. Cl.
B32B 41/00 (2006.01)
B23P 6/00 (2006.01)
G01B 15/06 (2006.01)
B32B 33/00 (2006.01)
B32B 43/00 (2006.01)
G01B 11/16 (2006.01)
G01L 1/24 (2006.01)
G01L 5/00 (2006.01)
(Continued)

(52) U.S. Cl.
CPC ............... B32B 41/00 (2013.01); B23P 6/00 (2013.01); B29C 73/10 (2013.01); B32B 33/00 (2013.01); B32B 43/00 (2013.01); B64F 5/40 (2017.01); G01B 11/16 (2013.01); G01B 15/06 (2013.01); G01K 13/00 (2013.01); G01L 1/24 (2013.01); G01L 5/00 (2013.01); G01M 5/0091 (2013.01); B29C 2035/0827 (2013.01); B32B 2307/422 (2013.01); B32B 2556/00 (2013.01); B32B 2605/18 (2013.01); Y10T 428/28 (2015.01)

(58) Field of Classification Search
CPC ........... B29C 66/9121; B29C 66/91211; B29C 66/91218; B32B 41/00; B32B 2309/02; B32B 2309/022; B32B 2309/12; B32B 2309/70; G01K 11/12; G01K 13/00; G01K 13/10
USPC .......................... 156/358, 359, 378, 64, 267
See application file for complete search history.

(56) References Cited

U.S. PATENT DOCUMENTS 4,015,465 A 4/1977 Scott
4,436,999 A 3/1984 Kern
(Continued)

FOREIGN PATENT DOCUMENTS

JP 060313738 A2 11/1994

OTHER PUBLICATIONS

Prescale "Tactile Pressure Indicating Sensor Film; Application: Bolted Joint / Gasket". Sensor Products Inc., 2011.*
(Continued)

Primary Examiner — George Koch
(74) Attorney, Agent, or Firm — Yee & Associates, P.C.

(57) ABSTRACT

A composite structure is processed using heat and pressure. A chromatic film is placed in proximity to the composite structure and is used to monitor at least one of the temperature of the heat and the pressure during processing.

19 Claims, 8 Drawing Sheets

(51) Int. Cl.
  *B29C 73/10* (2006.01)
  *G01M 5/00* (2006.01)
  *G01K 13/00* (2006.01)
  *B64F 5/40* (2017.01)
  *B29C 35/08* (2006.01)

(56) References Cited

U.S. PATENT DOCUMENTS

| | | | |
|---|---|---|---|
| 4,492,121 | A | 1/1985 | Lehto |
| 4,509,370 | A | 4/1985 | Hirschfeld |
| 4,784,811 | A | 11/1988 | Hirschfeld |
| 4,921,770 | A | 5/1990 | Murayama et al. |
| 5,034,254 | A | 7/1991 | Cologna et al. |
| 5,132,530 | A | 7/1992 | Groh et al. |
| 5,177,805 | A | 1/1993 | Groger et al. |
| 5,300,356 | A | 4/1994 | Dempster et al. |
| 5,330,718 | A | 7/1994 | Hui et al. |
| 5,438,879 | A | 8/1995 | Reda |
| 5,490,426 | A | 2/1996 | Shiga et al. |
| 5,573,848 | A * | 11/1996 | Van Praet ............ B32B 37/06 374/E11.018 |
| 5,756,356 | A | 5/1998 | Yanagi et al. |
| 5,817,945 | A | 10/1998 | Morris et al. |
| 5,963,310 | A | 10/1999 | Brown et al. |
| 5,984,874 | A | 11/1999 | Cerwin |
| 6,263,736 | B1 | 7/2001 | Thundat et al. |
| 6,311,557 | B1 | 11/2001 | Davis et al. |
| 6,327,030 | B1 | 12/2001 | Ifju et al. |
| 6,442,316 | B1 | 8/2002 | Rossi et al. |
| 6,808,804 | B2 | 10/2004 | Hotaka et al. |
| 7,037,973 | B2 | 5/2006 | Botros et al. |
| 7,127,950 | B2 | 10/2006 | Fonov et al. |
| 7,246,570 | B2 | 7/2007 | Weng et al. |
| 7,285,313 | B2 | 10/2007 | Kim et al. |
| 7,398,698 | B2 | 7/2008 | Griess et al. |
| 7,768,640 | B2 | 8/2010 | Cunningham et al. |
| 7,862,888 | B2 | 1/2011 | Toyama et al. |
| 8,038,815 | B2 | 10/2011 | Bailey et al. |
| 8,720,278 | B1 | 5/2014 | Toivola et al. |
| 9,085,052 | B1 | 7/2015 | Georgeson et al. |
| 2005/0158540 | A1* | 7/2005 | Sakai .................... C09J 7/0207 428/349 |
| 2006/0286407 | A1 | 12/2006 | Amano et al. |
| 2007/0100582 | A1 | 5/2007 | Griess et al. |
| 2008/0083286 | A1* | 4/2008 | Danowski ................ G01L 1/24 73/774 |
| 2008/0223152 | A1 | 9/2008 | Georgeson et al. |
| 2008/0278722 | A1 | 11/2008 | Cunningham et al. |
| 2008/0293095 | A1 | 11/2008 | Jelinek |
| 2009/0036304 | A1 | 2/2009 | Misner et al. |
| 2010/0213093 | A1* | 8/2010 | Iwasaki .............. B65D 73/0028 206/466 |
| 2010/0227105 | A1 | 9/2010 | Dan-Jumbo et al. |
| 2010/0227106 | A1 | 9/2010 | Dan-Jumbo et al. |
| 2010/0227117 | A1 | 9/2010 | Dan-Jumbo et al. |
| 2010/0276064 | A1 | 11/2010 | Blanchard et al. |
| 2010/0276065 | A1* | 11/2010 | Blanchard ........... B29C 65/7826 156/94 |
| 2011/0123712 | A1 | 5/2011 | Becker, IV et al. |
| 2011/0132523 | A1* | 6/2011 | Evens .................... B29C 73/10 156/94 |
| 2011/0316712 | A1 | 12/2011 | McIver et al. |
| 2012/0115719 | A1 | 5/2012 | Turner et al. |
| 2014/0138011 | A1* | 5/2014 | McClure .................. C09J 5/00 156/64 |
| 2015/0338296 | A1 | 11/2015 | Georgeson et al. |

OTHER PUBLICATIONS

Prescale "Tactile Pressure Indicating Sensor Film; Application: Wafer Bonding". Sensor Products Inc., 2011.*
"Standard Test Method for Assignment of the Glass Transition Temperature by Dynamic Mechanical Analysis," Designation E 1640-04, ASTM International, 5 pages.
"Technical Data, Desoprime CF/CA 7501," PPG Aerospace, Feb. 2010, 2 pages. Accessed Sep. 23, 2011, http://www.ppg.com/coatings/aerospace/coatings/coatingsproducts/Documents/Desoprime_CF_CA_7501.pdf.
"Technical Data, Desothane HS Buffable Clear Topcoat CA 8800/B900,""PPG Aerospace, Feb. 2010, 2 pages. Accessed Sep. 23, 2011,http://www.ppg.com/coatings/aerospace/coatings/coatingsproducts/Documents/Desothane_HS_Buffable_Clear_Topcoat_CA_8800_B900.pdf".
Birks, "Excimers," Reports on Progress in Physics, vol. 38, No. 8, Jan. 1975, pp. 903-974.
Cantwell et al., "An Assessment of the Impact Performance of CFRP Reinforced with High-strain Carbon Fibres," Composite Science and Technology, vol. 25, Issue 2, 1986, pp. 133-148.
Drickamer et al., "Two Examples of Pressure Tuning Spectroscopy in Solid Polymeric Media," Industrial and Engineering Chemistry Research, vol. 40, No. 14, Apr. 2001, pp. 3038-3041.
Kumar et al., "Delaminations of barely visible impact damage in CFRP laminates," Composite Structures, vol. 23, No. 4, 1993, pp. 313-318.
Lowe et al., "Oligo(p-phenylene vinylene) Excimers as Molecular Probes: Deformation-Induced Color Changes in Photoluminescent Polymer Blends," Advanced Materials, Nov. 2002, vol. 14, No. 22, 1625-1629.
Luo et al., "Aggregation-induced emission of 1-methyl-1,2,3,4,5-pentaphenylsilole," Chemocomm Communication, Aug. 2001, pp. 1740-1741.
Morton et al., "Impact Response of Tough Carbon Fibre Composites," Composite Structures, vol. 13, Issue 1, 1989, 19 pages.
Poon et al., "Assessment of Impact Damage in Toughened Resin Composites," Theoretical and Applied Fracture Mechanics, vol. 13, Issue 2, 1990, pp. 81-97.
Toivola et al., "Stress Sensitive Fluorescent Dyes for Damage Detection in Aerospace Primers & Coatings," SEMPE 2011 Conference and Exhibition Conference Program, Long Beach, CA, May 2011, 17 pages.
Van Keuren et al., "Three-dimensional thermal imaging using two-photon microscopy," Journal of Physics D.: Applies Physics, vol. 37, No. 20, Sep. 2004, pp. 2938-2943.
Woo et al., "Solvent Effects on the Two-Photon Absorption of Distyrylbenzene Chromophores," Journal of American Chemical Society, vol. 127, Issue 42, Sep. 2005, pp. 14721-14729.
Wu et al., "Enhancement of Aggregation-Induced Emission in Dye-Encapsulating Polymeric Micelles for Bioimaging," Advanced Functional Materials, vol. 20 Issue 9, May 2010, pp. 1413-1423.
Yang et al., "Excimer Formation in Uniaxially Stretched Polymer Films," Journal of Applied Polymer Science, vol. 82, Issue 10, Dec. 2001, pp. 2347-2351.
Likhtenshtein, "Stilbenes Preparation and Analysis," Applications in Chemistry, Life Sciences and Materials Science, Dec. 2009, pp. 1-9.
Prescale, "Tactile Pressure Indicating Sensor Film; Application: Bolted Joint/Gasket," Sensor Products Inc., 2011.
Prescale, "Tactile Pressure Indicating Sensor Film; Application: Wafer Bonding," Sensor Products Inc., 2011.
Office action dated Dec. 6, 2013 regarding U.S. Appl. No. 13/310,333, 27 pages.
Notice of Allowance dated Feb. 6, 2014 regarding U.S. Appl. No. 13/310,333, 10 pages.
Office Action, dated Jun. 20, 2013, regarding U.S. Appl. No. 13/310,539, 25 pages.
Final Office Action dated Nov. 8, 2013 regarding U.S. Appl. No. 13/310,539, 15 pages.
Office Action dated Jun. 13, 2014, regarding U.S. Appl. No. 13/310,539, 25 pages.
Final Office Action dated Aug. 27, 2014, regarding U.S. Appl. No. 13/310,539, 22 pages.
Final Office Action dated Dec. 12, 2014, regarding U.S. Appl. No. 13/310,539, 24 pages.
Notice of Allowance dated Mar. 17, 2015 regarding U.S. Appl. No. 13/310,539, 7 pages.

(56) References Cited

OTHER PUBLICATIONS

Office Action dated May 20, 2015, regarding U.S. Appl. No. 13/791,207, 46 pages.
Final Office Action dated Sep. 17, 2015, regarding U.S. Appl. No. 13/791,207, 20 pages.
Office Action dated Jan. 29, 2016, regarding U.S. Appl. No. 13/791,207, 25 pages.
Notice of Allowance dated May 20, 2016, regarding U.S. Appl. No. 13/791,207, 16 pages.
Office Action, dated Dec. 29, 2016, regarding U.S. Appl. No. 14/722,149, 39 pages. (11-0204-US-DIV).

* cited by examiner

MONITORING COMPOSITE MANUFACTURING AND REPAIR PROCESSES USING CHROMATIC FILMS

This application is a divisional application of U.S. patent application Ser. No. 13/791,207, filed Mar. 8, 2013, now U.S. Pat. No. 9,446,575 B1.

CROSS REFERENCE TO RELATED APPLICATIONS

This application is related to co-pending U.S. patent application Ser. No. 12/310,333, filed on Dec. 2, 2011, and co-pending U.S. patent application Ser. No. 13/310,539, filed on Dec. 2, 2011, both of which applications are incorporated by reference herein in their entireties.

BACKGROUND INFORMATION

1. Field

The present disclosure generally relates to processes for manufacturing and/or repairing composite structures, and deals more particularly with monitoring composite structures as they are being cured.

2. Background

Fiber reinforced thermoset resin structures, such as carbon fiber epoxy, may be cured through the application of heat and pressure using autoclave or out-of-autoclave processes. In order to optimize properties of the cured structure, it is sometimes desirable to monitor temperature and/or pressure during curing to determine whether either of these process parameters are outside of specified ranges.

Several techniques have been employed to monitor temperature and/or pressure during the cure process, however each has disadvantages. For example, thermocouples may be located at specific locations on a composite structure or a composite repair in order to monitor temperature, however thermocouples only provide temperature information at specific locations and may not reveal out-of-range temperature information at other locations. Thermocouples may have less than desired reliability, and may not be practical for use on large, complex structures or composite repairs that extend over a relatively large area. In some applications, thermocouples may also interfere with the cure process itself, particularly where thermocouples are placed in incorrect areas beneath vacuum bagging material.

IR (infrared) cameras may be used to monitor temperature within exposed areas of a composite structure during curing, however infrared cameras are relatively expensive, are limited to line-of-sight monitoring, and are not capable of monitoring areas of a structure beneath the vacuum bags.

Techniques have been devised to measure the pressure being applied to a composite structure or composite repair during curing using discrete pressure sensors. However, the sensed pressure information is limited to the location of the pressure sensors, consequently, this technique does not provide useful information concerning pressure over large areas of the structure. Moreover, the use of pressure sensors can, themselves result in undesirable mark-off when installed in highly convex or concave regions of a structure where pressure measurements may be particularly useful. Furthermore, it may be impractical to use pressure sensors with certain types of curing equipment, such as press claves.

Accordingly, there is a need for a method and apparatus for monitoring process parameters, such as temperature and pressure, over large areas of a composite structure during curing. There is also a need for a method and apparatus as described above which provide a permanent visual map of temperature and pressure over the entire area of a composite structure during curing, and which may be employed to alter process parameters in real-time during the curing process, thereby optimizing the properties of the cured composite structure or repair.

SUMMARY

The disclosed embodiments provide a system and method for monitoring processing of a composite structure to determine whether one or more processing parameters is outside of preselected limits which may affect properties of the completed structure. The embodiments provide a visual map of the entire area of the composite structure, allowing operating personnel to quickly and easily detect whether process parameters, such as temperature and pressure, are outside of preselected limits. Mapping is achieved using a chromatic film containing at least one of a thermochromatic dye and a mechanochromatic dye that is tailored to respond to specific thermal or time-temperature ranges and/or pressures. The chromatic material may be embedded into a film, or may be sprayed or otherwise applied as a coating on a sheet of paper or plastic. The chromatic film may also be in the form of a caul sheet. Process parameters may be monitored continuously during a fabrication process such as curing, and a permanent record of the map may be generated for analysis and/or comparison to a set of reference data, or maps of other composite structures. The embodiments may improve qualities of composite structures and reduce scrap.

According to one disclosed embodiment, a method is provided of monitoring at least one process parameter affecting processing of a composite structure, comprising placing a chromatic film in proximity to the composite structure, processing the composite structure, including subjecting the composite structure to heat and pressure, and using the chromatic film to monitor at least one of a temperature and pressure in real-time during the processing. Placing the chromatic film includes placing a sheet of the chromatic film over the composite structure layup. Using the chromatic film to monitor at least one of temperature and pressure includes detecting visual changes in the chromatic film to determine whether at least one of the temperature and pressure is outside a preselected range during the processing. Placing the chromatic film may include adhesively attaching each of a plurality of chromatic film segments around the perimeter of the composite structure. Using the chromatic film to provide a visual indication includes illuminating the chromatic film with light, recording an image of the chromatic film with a camera, and analyzing the recorded image to determine whether the at least one of the temperature and pressure is outside of the preselected range. The method may further comprise altering the process based on the results of the analysis of the recorded image. The chromatic film includes at least one of a thermochromatic dye, and a mechanochromatic dye. Using the chromatic film to provide a visual indication includes detecting a fluorescence or non-fluorescence of the chromatic film. The method may also comprise sealing a vacuum bag over the chromatic film and the composite structure.

According to another embodiment, a method is provided of monitoring curing of a composite structure. The method comprises placing a chromatic film in proximity to the composite structure which visually changes in response to application thereto of at least one of heat and pressure outside of preselected temperature and pressure ranges. The method also comprises curing the composite structure using heat and pressure, illuminating the chromatic film with light, and, monitoring visual changes in the illuminated chromatic film. The method further comprises recording an image of the illuminated chromatic film, and analyzing the recorded image to determine whether at least one of the heat and pressure is outside the preselected range of temperatures and pressures. The method also comprises altering the curing of the composite structure based on the analysis of the recorded image. Placing the chromatic film includes placing the chromatic film over and extending completely across the composite structure. The composite structure may be a repair patch, and placing the chromatic film includes placing the chromatic film around the periphery of the repair patch.

According to still another embodiment, apparatus is provided curing a composite structure, comprising a tool adapted to have a composite structure layup placed thereon, and a chromatic film located in proximity to the composite structure layup for monitoring at least one of heat and pressure to which the composite structure layup is subjected. The chromatic film includes at least one of a thermochromatic dye, and a mechanochromatic dye. The chromatic film overlies and substantially covers the entire area of the composite structure. In one variation, the chromatic film substantially surrounds the periphery of the composite structure. The apparatus may further comprise a source of illumination for illuminating the chromatic film with light, and a camera for recording an image of the illuminated chromatic film. The apparatus may further comprise a vacuum bag adapted to be sealed over the composite structure layup for applying compaction pressure to the composite structure layup during curing, wherein the chromatic film is integrated with the vacuum bag. The chromatic film is responsive to at least one of heat and pressure applied to the composite structure layup during curing to provide a visual indication of whether the at least one of heat and pressure is outside a range of preselected values during the curing.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and advantages thereof, will best be understood by reference to the following detailed description of an illustrative embodiment of the present disclosure when read in conjunction with the accompanying drawings, wherein:

DETAILED DESCRIPTION

Figure 1:
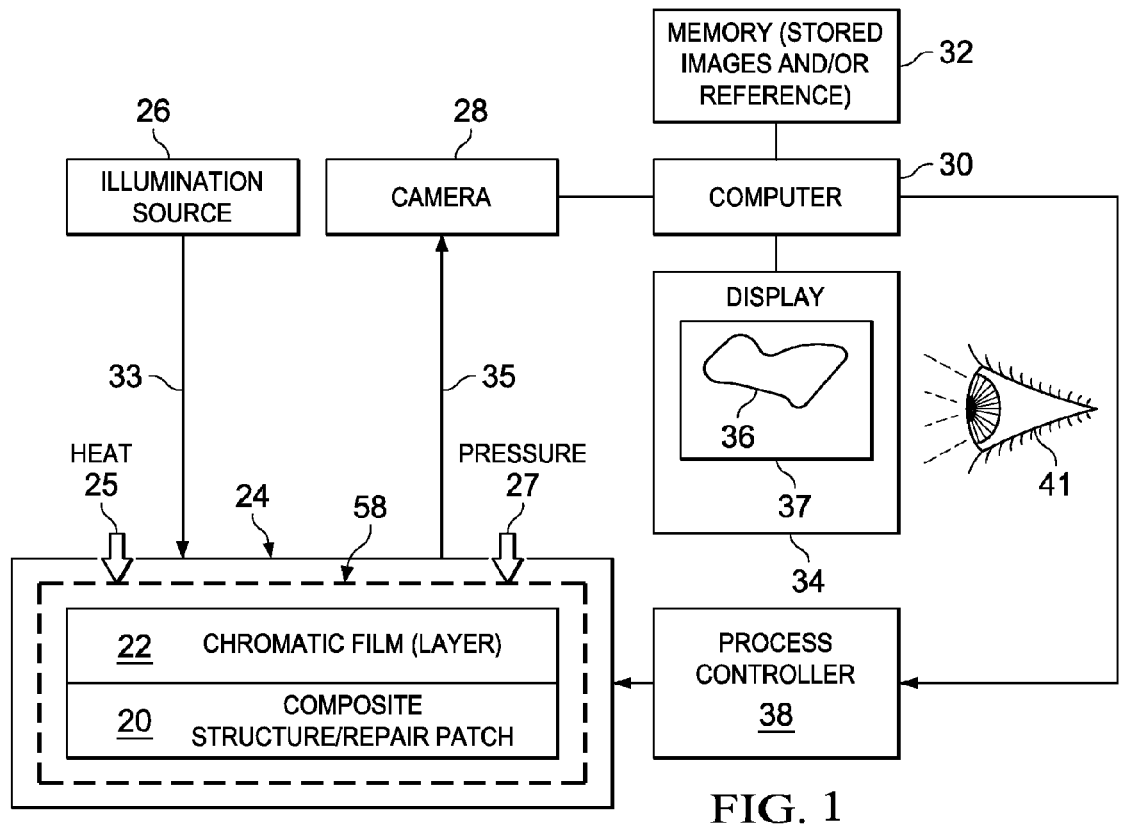
FIG. 1 is an illustration of a functional block diagram of a system for monitoring process parameters during fabrication of a composite structure.

FIG. 1 illustrates a system for monitoring processes such as curing, used in fabricating a composite structure 20. The composite structure 20, hereinafter sometimes referred to as a composite layup 20, may comprise a multi-ply part layup or a composite laminate rework patch such as that used to repair or rework a composite skin (not shown) or other structure. The composite layup 20 may be formed of a fiber reinforced thermoset resin, such as, without limitation, carbon fiber epoxy, however the disclosed system may be employed to monitor processes used to fabricate composite structures formed of other composite materials, such as thermoplastics.

The composite layup 20 is consolidated by curing it in a cure apparatus 24 which may comprise, for example and without limitation, an autoclave or an oven, in which the composite layup 20 is subjected to a combination of heat 25 and pressure 27. Consolidation may be aided by use of vacuum bag 58 which applies compaction pressure to the composite layup 20.

It may be desirable in some applications to monitor certain process parameters, such as at least one of temperature of the heat 25 and pressure 27, in order to verify that the composite layup 20 has not been subjected to temperatures and pressures 27 outside of specified values or ranges of values for prescribed time periods. Subjecting the composite layup 20 to temperatures or pressures outside of the specified values may have undesired affects on the completed composite structure 20.

In accordance with the disclosed embodiments, process parameters such as at least one of temperature of the heat 25 and the pressure 27 may be continuously monitored and recorded during a fabrication process such as curing, or verified after the process has been completed. The process parameters may be monitored over the entire area, if desired, of the composite structure layup 20 in order to verify that all sections of the layup 20 have been properly processed according to specifications. In order to monitor whether the process parameters are out-of-range, a chromatic film 22 is placed in proximity to the composite structure layup 20 within the vacuum bag 58, and is thus subjected to the same temperatures and pressures within the cure apparatus 24 that are used to process the composite layup 20. The chromatic film 22 is illuminated 33 by a suitable radiation source 26 which may comprise, for example and without limitation a UV source (ultraviolet), IR (infrared) source or other radiation source of a suitable wavelength. As will be discussed below in more detail, the chromatic film 22 may visually change in response to the application thereto of heat and/or pressure during a processing cycle.

Depending upon the application, and the particular process parameters to be monitored, the chromatic film 22 may comprise a material that includes thermochromatic and/or mechanochromatic dyes that are respectively tailored to respond to specific thermal or time-temperature ranges and/or pressures. When triggered by exposure to the temperatures and/or pressures to which they have been tailored, these dyes undergo fluorescent shifts. When illuminated by a light source of a suitable wavelength, these fluorescent shifts in the chromatic film 22 become visible, manifesting themselves as a change in color or color intensity, or a turning on or off of fluorescence. As will be discussed below in more detail, the dyes may be mixed with other materials to form a film, applied as a coating (not shown) to paper or plastic, or integrated into materials used as vacuum bags.

A camera 28, which may comprise a solid-state digital camera or other suitable recording device, records images 37 of the chromatic film 22 which result from reflection or backscattering 35 of light from the chromatic film 22. Each image 37 recorded by the camera 28 is processed by a suitable computer 30 and is output to a display 34. Certain areas 36 of the chromatic film where the process parameters, such as temperature and/or pressure, are out-of-range and result in fluorescent shifts in the chromatic film 22, are made visible in the image 37 displayed to the operator 41 or may be processed directly by the computer 30. This visible, process out-of-range indication may be in the form of a change in color, color intensity or fluorescence within certain areas 36 of the chromatic film 22. Thus, an operator may visually verify that process parameters have remained within the proper range of values during an entire process cycle, or that certain areas of the chromatic film 22, and thus of the composite structure 20, have been subjected to temperatures and/or pressures that are outside of the prescribed ranges.

The computer 30 may store images 37 recorded of previously fabricated composite structures 20, or other reference data in a memory 32. The stored image 37 or reference data may be retrieved by the computer 30 and compared to later recorded images 37 for purposes of quality control or process control. Based on the image 37 recorded by the camera 28, the computer 30 may provide information to a process controller 38 that may adjust process parameters, such as temperature and/or pressure, on a real-time basis if desired, used by the apparatus 24, or in preparation for processing the next composite layup 20.

Figure 2:
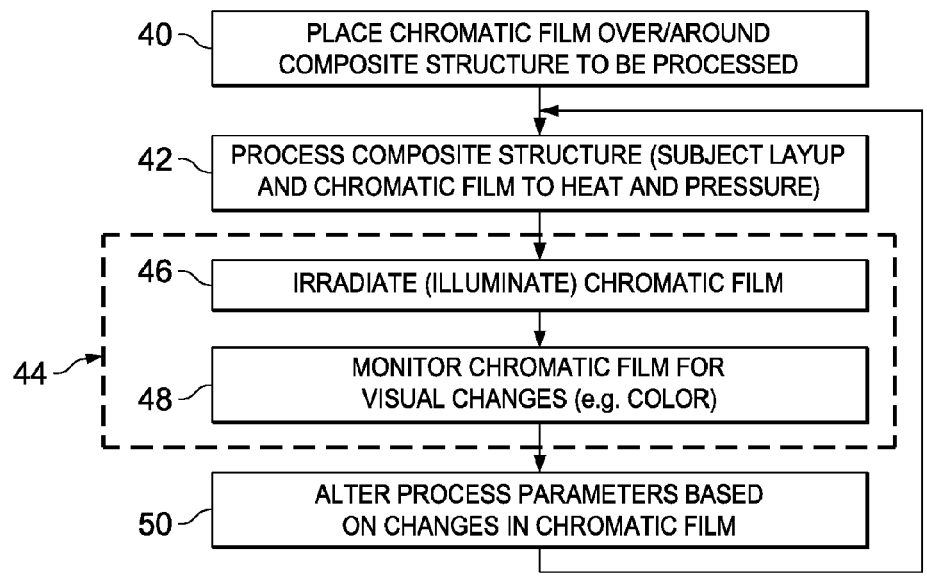
FIG. 2 is an illustration of a flow diagram of a method of monitoring process parameters during fabrication of a composite structure.

FIG. 2 illustrates the overall steps of a method of monitoring process parameters using the system shown in FIG. 1. Beginning at step 40, a chromatic film 22 is placed over, around or in proximity to a composite layup 20 to be processed. In those applications where process parameters are being monitored in real time as the process is being carried out, the chromatic film 22 is placed in a position where it can be viewed by the camera 28. In other applications, where the chromatic film 22 is reviewed only after the process is completed, the chromatic film 22 may be located in an area on or near the composite layup 20 that may be obscured from view. At step 42, the composite layup 20 is processed which may comprise, for example and without limitation, curing the composite layup 20. During processing at step 42, the composite layup 20 and the chromatic film 22 are subjected to a combination of heat and pressure for prescribed periods of time according to a desired schedule (not shown). As shown at 44, the chromatic film is used to monitor, detect and record process parameters such as temperature and/or pressure during a cure cycle to find out if any may be outside of preselected ranges of values. This monitoring process comprises, at step 46, illuminating the chromatic film 22 with light of a preselected wavelength, such as in the ultraviolet or infrared range, and, at step 48, monitoring the chromatic film 22 for visual changes. These visual changes may comprise changes in color and/or color intensity of particular areas 36 of the chromatic film 22. The visual changes may indicate that the composite structure layup 20 has been subjected to temperatures and/or pressures that are outside of the desired range of values. Thus, the chromatic film 22 acts as a "witness" that permanently records and report out-of-range process parameters that may be used to assess the suitability of the completed composite structure 20 for an intended application, or to adjust process parameters.

As previously discussed, the monitoring process may be carried out by recording images 37 of the chromatic film 22 and monitoring these recorded images 37 for visual changes. Image monitoring may be carried out by a human 41 (FIG. 1) or automatically by a computer 30 or similar processor. The monitoring process may be carried out in real time to effect real time process control. Alternatively, however, recorded images 37 of the chromatic film 22 may be viewed and analyzed only after the process is completed, in which case information derived from viewing the chromatic film 22 may be used to determine whether the just-processed part is within specifications, and/or to adjust process parameters in preparation for processing the next part. At step 50, process parameters may be altered by an operator, either on a real-time basis, or after the composite layup 20 has been processed, either using a human 41 to view the recorded images 37 and make the necessary changes in processing or automatically, using a computer 30.

Figure 3:
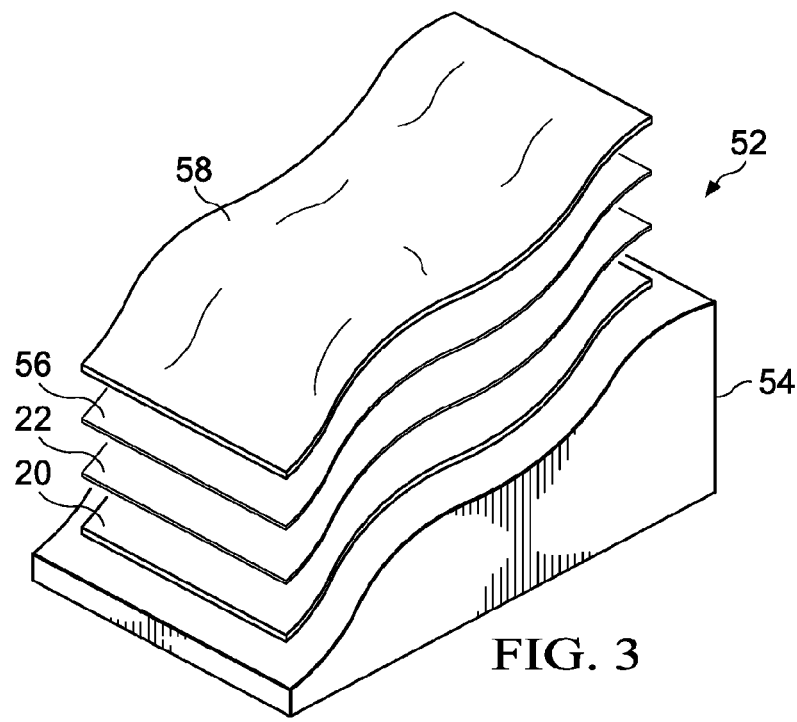
FIG. 3 is an illustration of a perspective, exploded view showing use of the chromatic film for vacuum bag processing of a composite structure.
Figure 4:
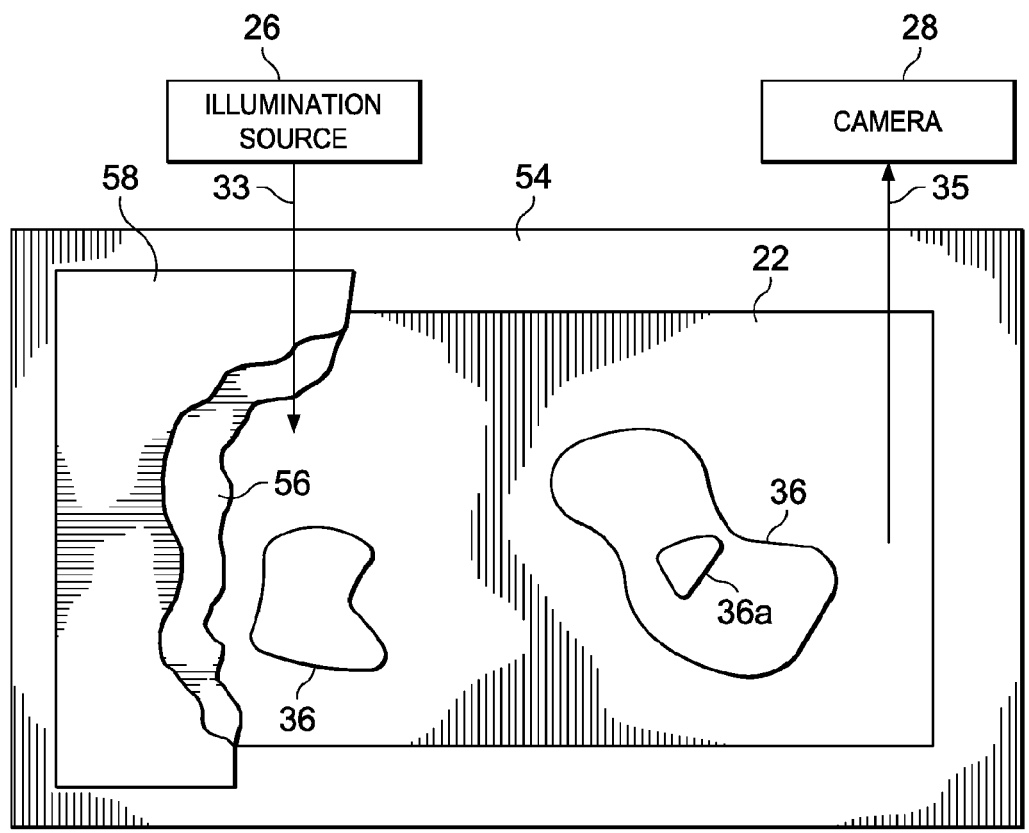
FIG. 4 is an illustration of a plan view of the vacuum bag assembly shown in FIG. 3, parts of the vacuum bag and bagging materials broken away to reveal color changes in the chromatic film during curing.

Attention is now directed to FIGS. 3 and 4 which illustrate one embodiment employing a chromatic film which may be used to monitor cure parameters over the entire area, if desired, of a composite layup 20 which forms part of a vacuum bagged assembly 52. The composite layup 20 is on a tool 54. A chromatic film 22, which in this example, is in sheet form, is placed in face-to-face contact with, and substantially covers the entire area of the layup 20. Optionally, the chromatic film 22 may be placed over only a portion of the area of the composite layup 20. Conventional bagging materials suitable for the application, generally indicated at 56, are placed over the chromatic film 22. The bagging materials may include but are not limited to the breathers, peel plies, caul sheets, etc. (not shown). Additionally, it may be necessary or desirable to place a peel ply (not shown) between the chromatic film 22 and the composite layup 20 to aid in separating the chromatic film 22 following curing. A flexible vacuum bag 58 is placed over the bagging materials 56 and is sealed to the tool 54 using any suitable sealing technique, such as through the use of a suitable sealant tape (not shown). The tool 54 along with the vacuum bagged assembly 52 are placed in an autoclave, or in an oven (not shown) and subjected to elevated temperature and pressure. The vacuum bag 58 is evacuated, causing the vacuum bag 58 to apply compaction pressure to the composite layup 20. In the case of autoclave curing, autoclave pressure aids in compacting and consolidating the composite layup 20.

Referring particularly to FIG. 3, the vacuum bagged assembly 52 is illuminated 33 with a suitable illumination 26 as previously described in connection with FIG. 1, and a camera 28 is used to record 35 images that may be produced by the chromatic film 22. In the illustrated example, as shown in FIG. 4, areas 36, 36a of the chromatic film 22 that experience a temperature, or a temperature over time, and/or pressures that are outside of specified ranges of values, change color, or change color intensity. These changes in color or color intensity are visible and may be viewed in real time and/or recorded as a permanent electronic image and viewed after the process has been completed.

Figure 5:
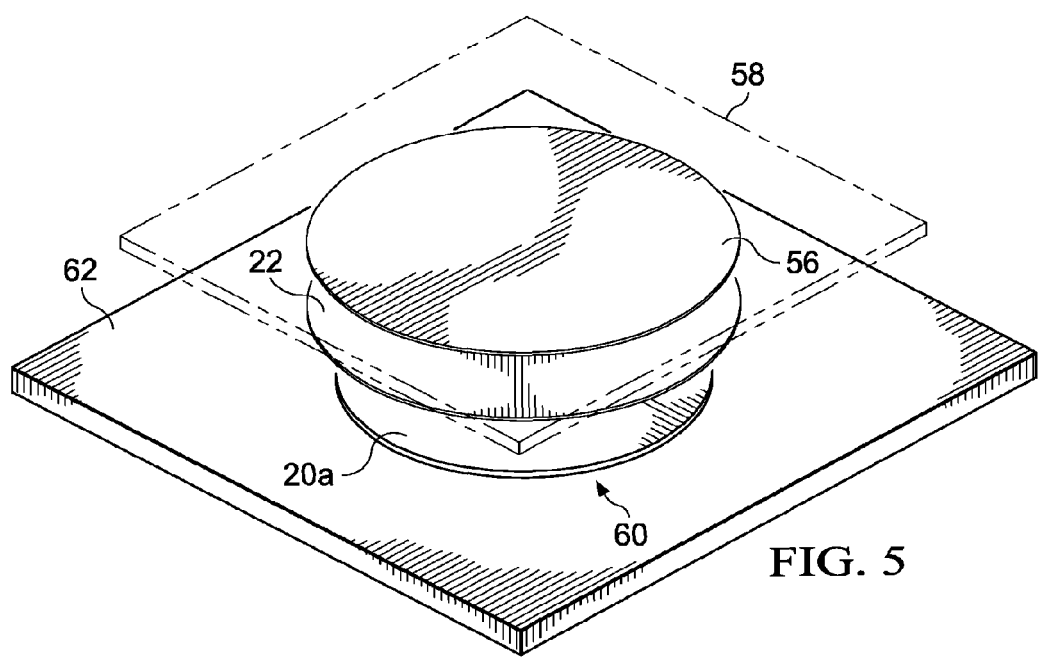
FIG. 5 is an illustration of a perspective, exploded view showing use of the chromatic film for monitoring curing of a composite rework patch repair used to repair a composite structure.
Figure 6:
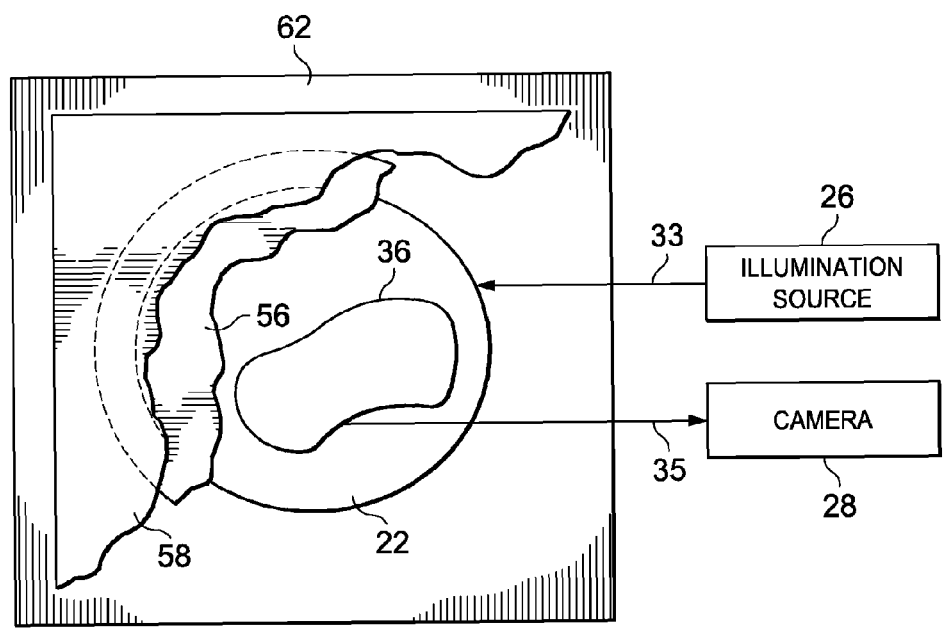
FIG. 6 is an illustration of a plan view the vacuum bag assembly shown in FIG. 5, parts of the bagging materials and vacuum bag being broken away to reveal color changes in the chromatic film during curing of the rework patch.

FIGS. 5 and 6 illustrate another embodiment in which a chromatic film 22 is used to monitor cure parameters during curing of a composite re-work patch 20a. The composite rework patch 20a is used to rework an area 60 in a structure 62, which may comprise, for example and without limitation, a composite aircraft skin. The area 60 to be reworked may comprise only several top plies of the skin, or may extend completely through the thickness of the skin. In this example, the composite rework patch 20a is placed either on the surface of the composite structure 62, or in a scarfed section (not shown) of the composite structure 62. A chromatic film 22 having substantially the same size and geometry of the composite rework patch 20a is placed over the rework patch 20a. In the illustrated example, both the composite rework patch 20a and the chromatic film 22 are circular in shape, however other geometries are possible that are suited to the application. Conventional bagging materials 56 are placed over the chromatic film 22, following which a vacuum bag 58 is placed over the bagging materials 56 and sealed to the composite structure 62.

During curing, a vacuum is drawn in the vacuum bag 58 to consolidate the composite rework patch 20a while heat is applied to the composite rework patch 20a. The heat may be supplied by an oven (not shown), or by local radiation sources, such as infrared lamps, or heating blankets (not shown). As in the example previously described in connection with FIG. 1, during curing, the chromatic film 22 is illuminated 33 with a suitable source of illumination 26, and a camera 28 or other recording device may be used to record 35 an image of the chromatic film 22. In this example, as shown in FIG. 6, the displayed image may include an area 36 of color change which indicates that a cure parameter such as temperature or pressure within the area 36 have been outside of specified ranges of values.

Figure 7:
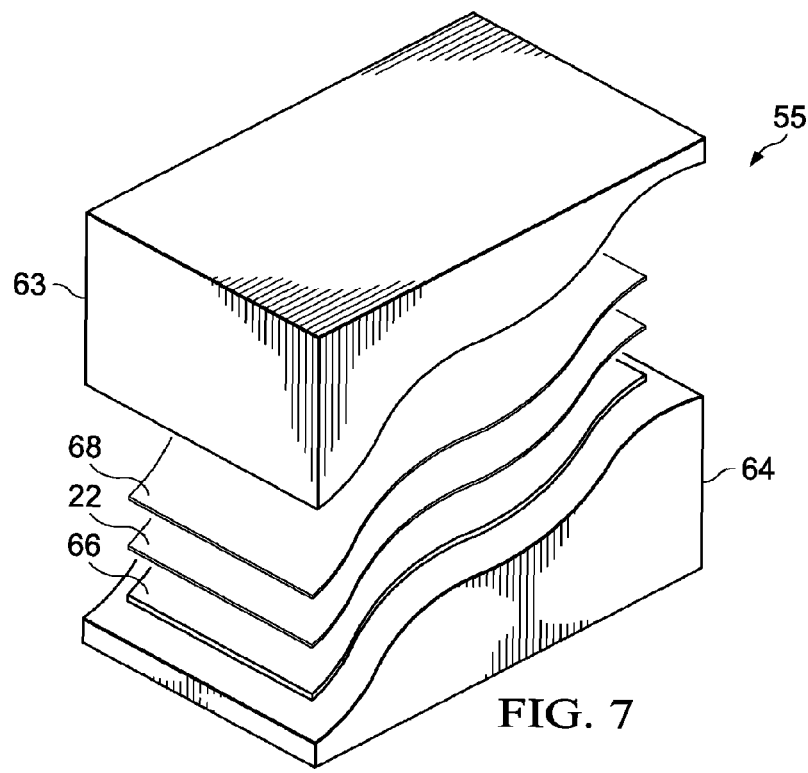
FIG. 7 is an illustration of an exploded, perspective view showing use of the chromatic film in a press clave employed to fabricate a composite structure.

Attention is now directed to FIG. 7 which illustrates the use of a chromatic film 22 to measure and record temperatures and/or pressures during fabrication of a pre-cured composite structure 66 in a heated press 55, which may comprise a press clave or a compression press. The heated press 55 includes upper and lower platens 63, 64 respectively. The pre-cured composite structure 66 is placed on the lower platen 64 and is covered by a sheet of chromatic film 22. A release sheet 68 is placed over the chromatic film 22, and the assembly of the composite structure 66, chromatic film 22 and release sheet 68 are subjected to heat and pressure applied by the press 55. In this embodiment, it is not possible to directly monitor the chromatic film 22 for color changes since it is substantially fully covered by the press platens 63, 64. However, the chromatic film 22 nevertheless measures and records temperatures and/or pressures in all areas of the chromatic film 22, and thus of all areas of the composite structure 66 that are subjected to temperatures and/or pressures that are outside of specified ranges. Upon completion of the fabrication process, the chromatic film 22 may be removed and viewed under light of a suitable wavelength. Any areas of the chromatic film 22 that have been subjected to temperatures and/or pressures that are out of the specified ranges will exhibit visible color changes.

Figure 8:
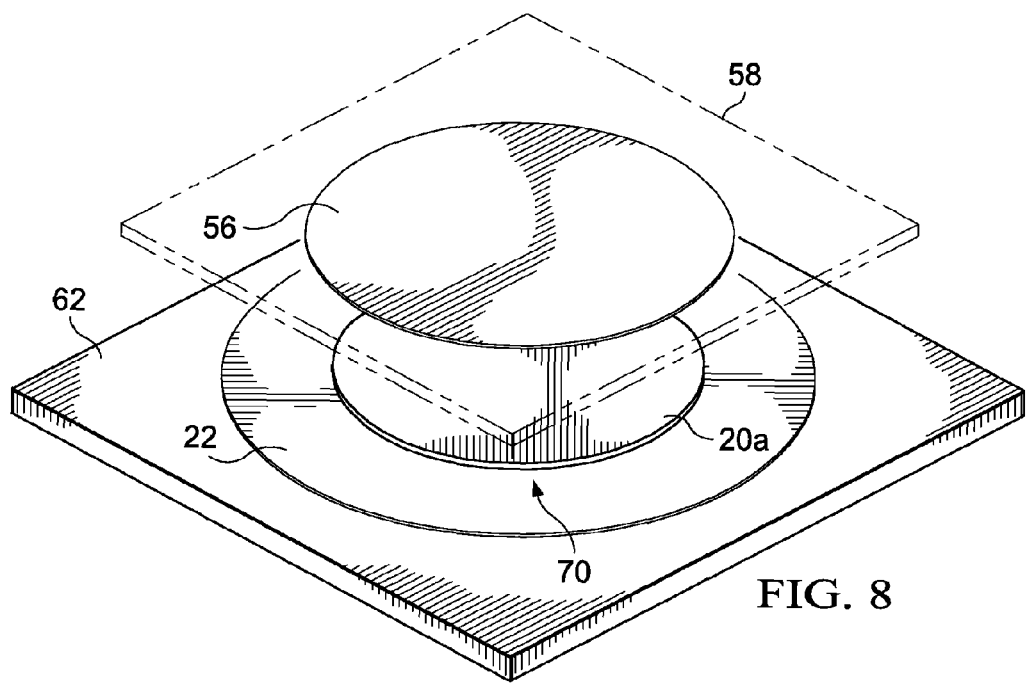
FIG. 8 is an illustration of an exploded, perspective view showing an alternate form of the chromatic sheet used to monitor curing of a composite rework patch used to repair a composite structure.
Figure 9:
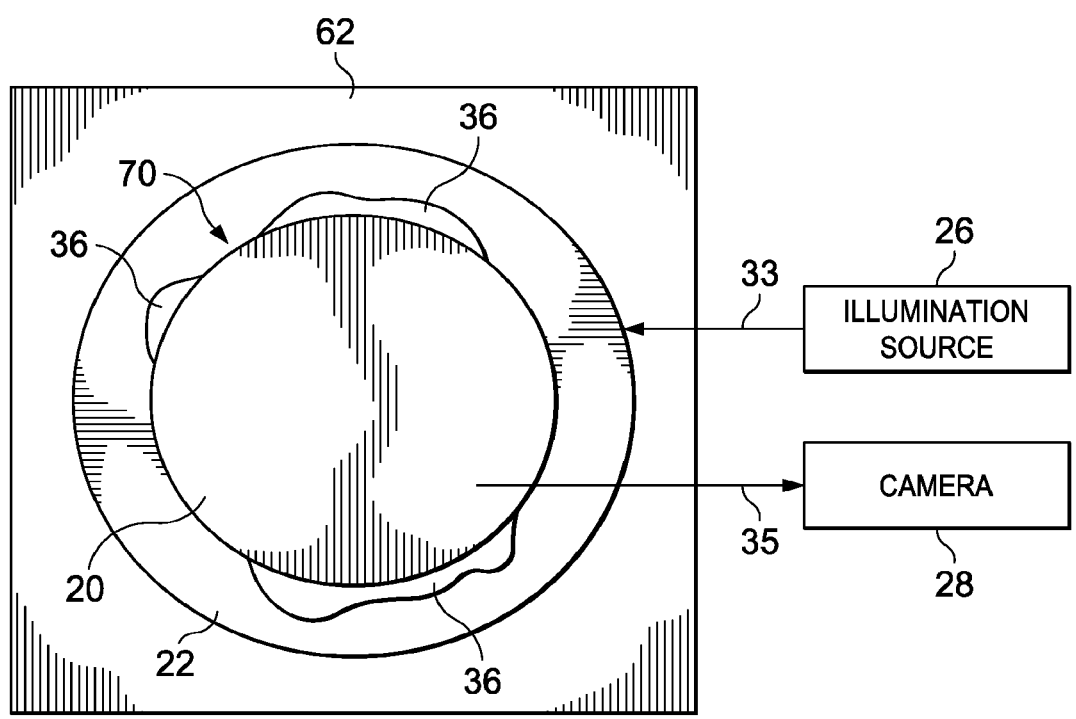
FIG. 9 is an illustration of a plan view of the composite structure shown in FIG. 8, the vacuum bag and bagging materials not shown for clarity, and illustrating color changes in the chromatic film that have occurred during curing.

FIGS. 8 and 9 illustrate another embodiment showing use of the chromatic film 22 to determine whether a circular rework patch 20a has been properly cured. The rework patch 20a may be used to repair or rework several top plies (not shown) of a composite structure 62 such as an aircraft skin, or to repair or rework an area that extends completely through the thickness of the skin. The rework patch 20a is covered with bagging materials 56 and a vacuum bag 58 which is sealed to a composite structure 62. The chromatic film 22 is ring-shaped, and substantially surrounds the peripheral edge 70 of the rework patch 20a. In this example, the chromatic film 22 is located beneath the vacuum bag 58. Although the entire area of the rework patch 20a is not monitored for temperature/pressure excursions outside of the specified ranges, areas 36 of color change in the chromatic film 22 at the peripheral edges 70 of the rework patch 20a may provide enough information to determine whether the rework patch 20a has been properly cured. In other embodiments, the chromatic film 22 may have other shapes matched to the peripheral geometry of a composite layup 20. As in previous examples, an illumination source 26 is used to illuminate 33 the chromatic film 22, and a camera 28 is used to record 35 the resulting image for viewing.

Figure 10:
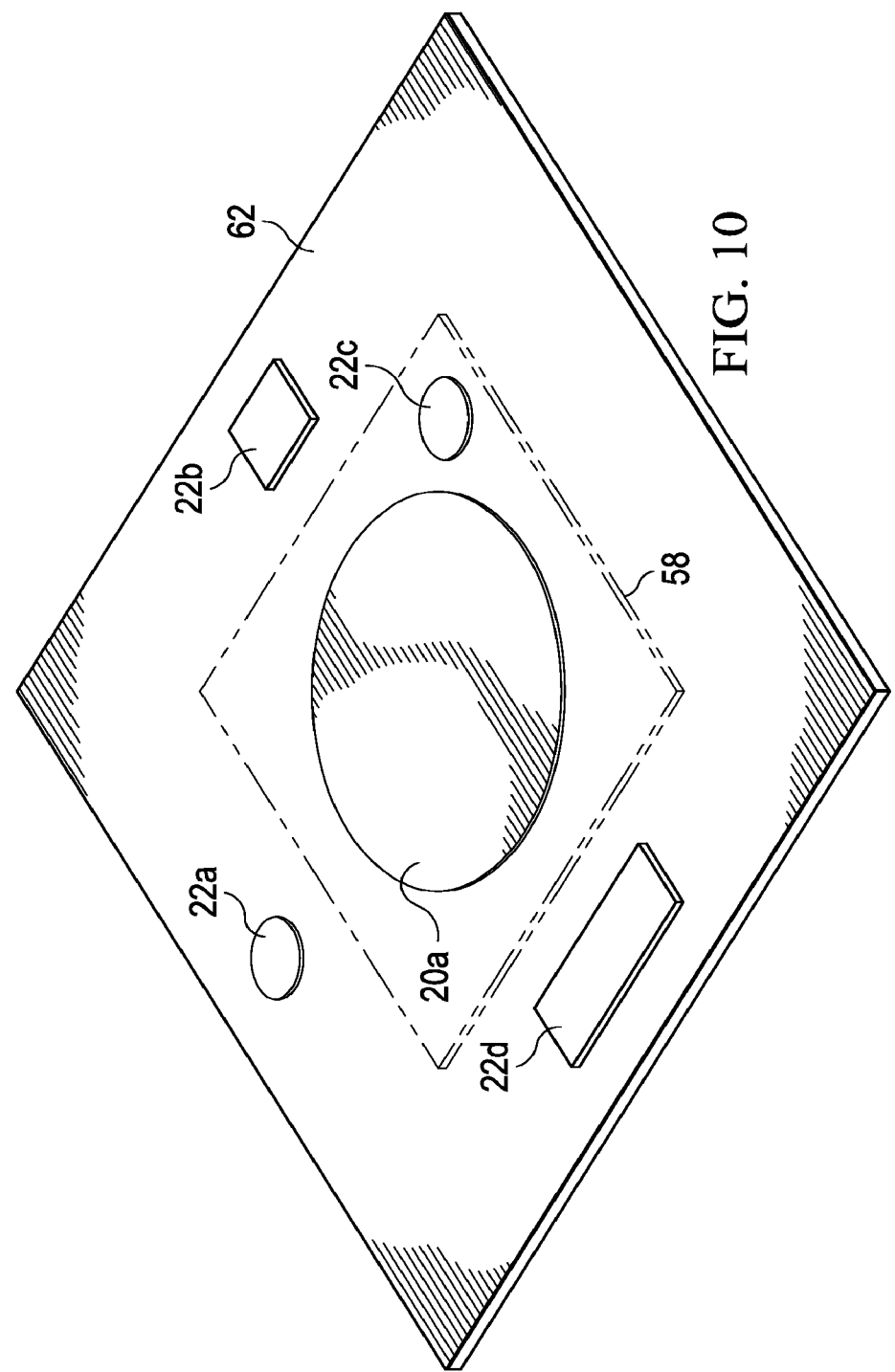
FIG. 10 is an illustration of a perspective view showing the use of individual, adhesive backed, chromatic film tape segments positioned around a vacuum bag covering a composite rework patch being cured.

FIG. 10 illustrates another embodiment showing use of the chromatic film 22a-22d to monitor temperature and pressure during curing of the composite rework patch 20a. In this example, the rework patch 20a is covered by bagging materials (not shown) and a vacuum bag 58 that is sealed to a composite structure 62. The chromatic film 22a-22d may comprise a series of an adhesively backed chromatic tape segments 22a-22d of various sizes and shapes that are adhered to the composite structure 62 outside of, but adjacent to the rework patch 20a. The chromatic tape segments 22a-22d may be located either beneath vacuum bag 58 (tape segment 22c), or outside of the vacuum bag 58 (tape segments 22a, 22b, 22d). Color changes in any of the tape segments 22a-22d may provide a visual indication of whether the rework patch 20a has been subjected to pressures and/or temperatures that are out of specifications.

Figure 11:
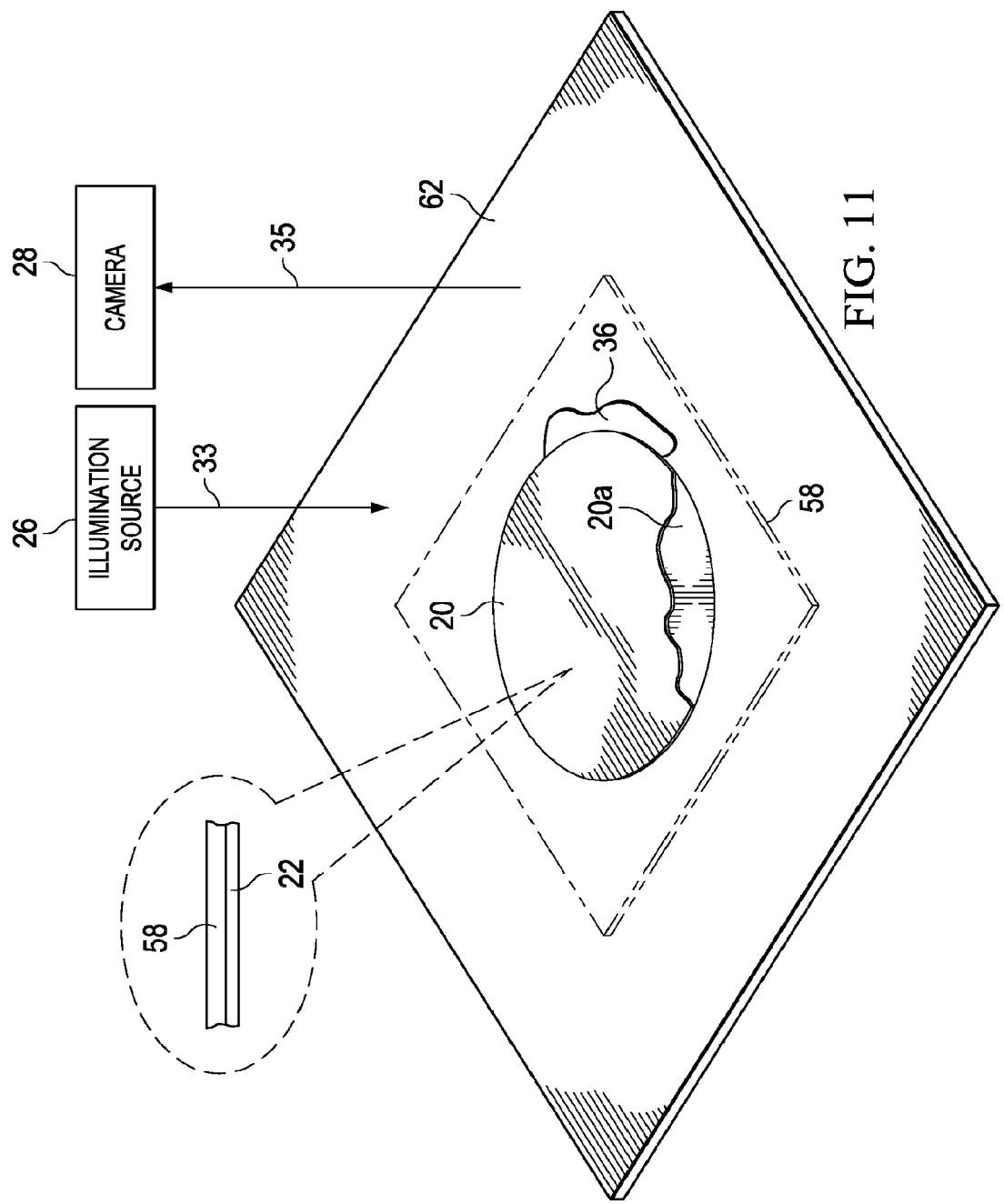
FIG. 11 is an illustration of a perspective view of a composite rework patch being cured using a vacuum bag having an integrated chromatic film.

Referring now to FIG. 11, it may be possible to integrate the chromatic film 22 into a vacuum bag 58 used to consolidate composite layups. For example, a chromatic film 22 may be bonded to or sprayed onto an inside face of a substantially transparent vacuum bag 58. In this example, the vacuum bag 58 is used to compact a composite rework patch 20a onto a composite structure 62. The vacuum bag 58 is sealed to the composite structure 62, surrounding the rework patch 20. The chromatic film 22 measures and records temperatures and pressures around the periphery of the composite rework patch 20 in order to provide a visual indication of whether the rework patch 20a has been subjected to temperatures and/or pressures during curing that are outside a specified range. Illumination source 26 is used to illuminate 33 the vacuum bag 58 and thus the chromatic film 22, and a camera 28 is used to record 35 the resulting image for viewing. In the illustrated example, an area 36 of color change indicating an out-of-range temperature or pressure can be seen through the vacuum bag 58. In cases where the vacuum bag 58 is not transparent, following removal of the vacuum bag 58, it may be turned over to allow direct viewing of color changes in areas 36 of the chromatic film 22.

Figure 12:
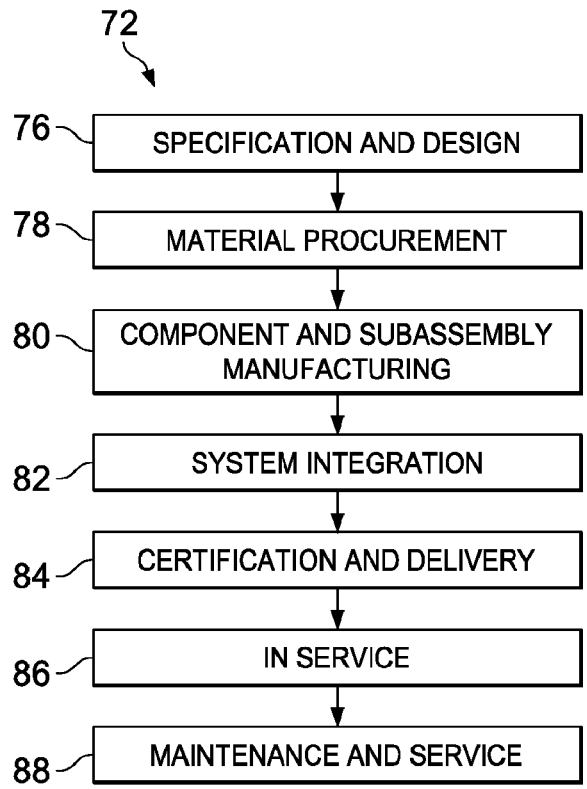
FIG. 12 is an illustration of a flow diagram of aircraft production and service methodology.
Figure 13:
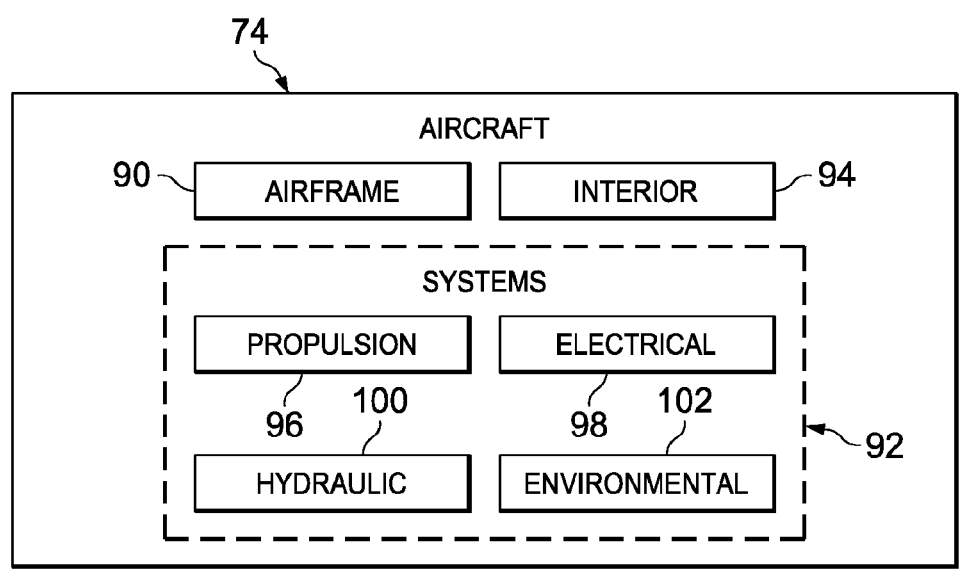
FIG. 13 is illustration of a block diagram of an aircraft.

Embodiments of the disclosure may find use in a variety of potential applications, particularly in the transportation industry, including for example, aerospace, marine, automotive applications and other applications involving processing of composite structures. Thus, referring now to FIGS. 12 and 13, embodiments of the disclosure may be used in the context of an aircraft manufacturing and service method 72 as shown in FIG. 12 and an aircraft 74 as shown in FIG. 13. Aircraft applications of the disclosed embodiments may include, for example, without limitation, spars, frames, stringers, beams and interior components to name only a few. During pre-production, exemplary method 72 may include specification and design 76 of the aircraft and material procurement 78. During production, component and subassembly manufacturing 80 and system integration 82 of the aircraft 74 takes place. Thereafter, the aircraft 74 may go through certification and delivery 84 in order to be placed in service 86. While in service by a customer, the aircraft 74 is scheduled for routine maintenance and service 88, which may also include modification, reconfiguration, refurbishment, and so on.

Each of the processes of method 72 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 13, the aircraft 74 produced by exemplary method 72 may include an airframe 90 with a plurality of systems 92 and an interior 94. Examples of high-level systems 92 include one or more of a propulsion system 96, an electrical system 98, a hydraulic system 100, and an environmental system 102. Any number of other systems may be included. Although an aerospace example is shown, the principles of the disclosure may be applied to other industries, such as the marine and automotive industries.

Systems and methods embodied herein may be employed during any one or more of the stages of the production and service method 72. For example, components or subassemblies corresponding to production process 80 may be fabricated or manufactured in a manner similar to components or subassemblies produced while the aircraft 74 is in service. Also, one or more apparatus embodiments, method embodiments, or a combination thereof may be utilized during the production stages 80 and 82, for example, by substantially expediting assembly of or reducing the cost of an aircraft 74. Similarly, one or more of apparatus embodiments, method embodiments, or a combination thereof may be utilized while the aircraft 74 is in service, for example and without limitation, to maintenance and service 88. During maintenance and service 88, the disclosed embodiments may be employed to monitor curing of composite patches used to carry out repairs on the airframe 90, such as repair of a composite skin (not shown).

As used herein, the phrase "at least one of", when used with a list of items, means different combinations of one or more of the listed items may be used and only one of each item in the list may be needed. For example, "at least one of item A, item B, and item C" may include, without limitation, item A, item A and item B, or item B. This example also may include item A, item B, and item C or item B and item C. The item may be a particular object, thing, or a category. In other words, at least one of means any combination items and number of items may be used from the list but not all of the items in the list are required.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different advantages as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. Apparatus for curing, via heat and pressure, a composite structure, such that the apparatus comprises:
   a radiation source, a camera, and an image processor;
   a tool adapted to receive a composite structure layup; and,
   a chromatic film that comprises a size, configured to lay adjacent to an entire surface area of the composite structure layup, and structured to continuously monitor at least one of heat and pressure, to which the composite structure layup is subjected, such that the chromatic film comprises a dye integrated throughout the chromatic film that comprises a fluorescent characteristic that indicates:
      responsive to an illumination from the radiation source, a fluorescent shift in the chromatic film mapped on an image from the image processor of a backscatter of the illumination from the chromatic film, such that the camera receives the backscatter and the image processor maps in real-time each change of temperature, across a tailored range of temperature, and each change of pressure, across a tailored range of pressure, in the chromatic film; and
      in the image from the image processor, a value of at least one of: a heat, and a pressure, as being outside a range of preselected values during the curing of the composite structure layup.

2. The apparatus of claim 1, wherein the chromatic film includes at least one of a thermochromatic dye, and a mechanochromatic dye.

3. The apparatus of claim 1, wherein the chromatic film overlies and substantially covers an entire area of the composite structure.

4. The apparatus of claim 1, wherein the chromatic film substantially surrounds a periphery of the composite structure.

5. The apparatus of claim 1, further comprising
   a vacuum bag adapted to be sealed over the composite structure layup for applying compaction pressure to the composite structure layup during curing, and
   wherein the chromatic film is integrated with the vacuum bag.

6. The apparatus of claim 1, further comprising:
   a source of illumination for illuminating the chromatic film with light; and,
   a camera for recording an image of the chromatic film.

7. A device, used in vacuum bag processing of a composite part to monitor a temperature and at least one additional process parameter, such that the device comprises:
 a radiation source, a camera, and an image processor;
 a chromatic film that comprises a dye integrated throughout the chromatic film that comprises a fluorescent characteristic and a size configured to:
  lay adjacent to an entire surface area of a composite layup; and
  indicate in an image from the image processor:
   a backscatter from illumination from the radiation source that is received by the camera and indicates a fluorescent shift in the chromatic film; and
   each change, across a tailored range of the temperature and a tailored range of the at least one additional process parameter, in the temperature and the at least one additional process parameter; and
   whether, during the vacuum bag processing, at least one of: the temperature, and the at least one additional process parameter, outlays a preselected range of values.

8. The device of claim 7, wherein the at least one additional process parameter comprises a pressure.

9. The device of claim 7, wherein the chromatic film includes at least one of a thermochromatic dye, and a mechanochromatic dye respectively tailored to exhibit fluorescent shifts outside of preselected ranges of temperature and pressure.

10. The device of claim 7, further comprising:
 a vacuum bag, and
 the chromatic film is bonded to the vacuum bag.

11. A manufacture configured to monitor, in real-time, at least one of: a pressure and a temperature of a composite layup throughout a curing the composite layup, such that the manufacture comprises:
 a radiation source, a camera, and an image processor, and a material;
 at least one of: a thermochromatic dye, and a mechanochromatic dye, integrated into an entire area of the material, such that the material covers an area, in proximity to an entire surface of the composite layup, and comprises a fluorescent characteristic configured to indicate in real-time;
 each change, across the area, in the temperature of the material, via a fluorescent shift in the material in response to each change, across a tailored range of temperatures,
 an image from the image processor of a backscatter from at least one of: an ultraviolet, and an infrared, illumination by the radiation source that is received by the camera of any thermochromatic dye integrated into the material, such that the image maps each change of the backscatter of the temperature and the pressure, of the composite layup during the curing.

12. The manufacture of claim 11, further comprising a sheet of the material located over the entire area of the composite layup.

13. The manufacture of claim 11, further comprising-at least one of: the temperature, and the pressure, comprising a desired range during curing of the composite layup.

14. The manufacture of claim 11, further comprising the material connected to an entirety of a perimeter of the composite layup.

15. The manufacture of claim 11, further comprising the material comprises at least one of: a caul sheet, a vacuum bag, and a coating.

16. The manufacture of claim 11, further comprising a surface of the composite layup comprising at least one: a concave, and a convex shape.

17. The manufacture of claim 11, further comprising:
 the composite layup comprising a repair patch; and
 a periphery of the repair patch covered with the material.

18. The manufacture of claim 11, further comprising the material comprising at least one of: paper and plastic.

19. The manufacture of claim 11, further comprising further comprising a caul sheet comprising the material.

* * * * *

UNITED STATES PATENT AND TRADEMARK OFFICE
CERTIFICATE OF CORRECTION

PATENT NO. : 9,656,453 B2  
APPLICATION NO. : 15/173718  
DATED : May 23, 2017  
INVENTOR(S) : Georgeson et al.

Page 1 of 1

It is certified that error appears in the above-identified patent and that said Letters Patent is hereby corrected as shown below:

Column 10, Line 58, change "further comprising" to --further comprising:--  
Column 10, Line 66, change "light; and," to --light; and--  
Column 11, Line 35, change "a curing the composite" to --a curing of the composite--  
Column 12, Line 3, correct "in real-time;" to --in real-time:--  
Column 12, Line 17, change "the entire area" to --the entire surface--

Signed and Sealed this  
Sixth Day of November, 2018

Andrei Iancu  
*Director of the United States Patent and Trademark Office*